US008588786B2

(12) United States Patent
Weeresinghe

(10) Patent No.: US 8,588,786 B2
(45) Date of Patent: Nov. 19, 2013

(54) METHOD AND APPARATUS FOR IP ENCAPSULATED TANDEM HARD HANDOFF IN CDMA NETWORKS

(75) Inventor: Ranjith T. Weeresinghe, Allen, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/306,716

(22) Filed: Nov. 29, 2011

(65) Prior Publication Data

US 2013/0137439 A1 May 30, 2013

(51) Int. Cl.
*H04W 36/00* (2009.01)
(52) U.S. Cl.
USPC ........... 455/439; 455/438; 455/445; 455/560; 370/331; 370/401
(58) Field of Classification Search
USPC .................. 455/436–445, 560–561; 370/401
See application file for complete search history.

(56) References Cited

U.S. PATENT DOCUMENTS

| 5,018,187 | A   | * | 5/1991  | Marinho et al. | 455/439 |
|-----------|-----|---|---------|----------------|---------|
| 6,125,276 | A   | * | 9/2000  | Lupien         | 455/436 |
| 6,442,388 | B1  | * | 8/2002  | Lopez et al.   | 455/436 |
| 6,542,476 | B1  | * | 4/2003  | Elizondo et al.| 370/278 |
| 6,577,867 | B1  | * | 6/2003  | Elizondo       | 455/436 |
| 6,594,492 | B2  | * | 7/2003  | Choi et al.    | 455/436 |
| 6,819,929 | B2  | * | 11/2004 | Antonucci et al.| 455/445 |
| 6,888,803 | B1  | * | 5/2005  | Gentry et al.  | 370/259 |
| 2012/0213198 | A1 | * | 8/2012  | Nguyen et al.  | 370/331 |

* cited by examiner

Primary Examiner — Sharad Rampuria

(57) ABSTRACT

A method and apparatus in a mobile switching center (MSC) performs a tandem handoff in a wireless communication network. The serving MSC receives a handoff request from a serving base station (BS) for a handoff to a target BS of a target MSC. When the serving MSC does not have physical handoff trunks, the serving MSC sends a tandem handoff request to a tandem MSC.

20 Claims, 10 Drawing Sheets

METHOD AND APPARATUS FOR IP ENCAPSULATED TANDEM HARD HANDOFF IN CDMA NETWORKS

TECHNICAL FIELD OF THE INVENTION

The present application relates generally to telecommunications networks and, more specifically, to IP encapsulated tandem hard handoffs in CDMA networks.

BACKGROUND OF THE INVENTION

In Code Division Multiple Access (CDMA) networks, Mobile Hard Handoff (HHO) is performed between two Mobile Switch Centers (MSCs). This requires a direct Inter-Machine Trunk (IMT) between the two MSCs (governed by the IS-41 standard). Hence, every neighboring MSC must have an IMT between each of the MSC's to enable Mobile HHO. In the event that an MSC is added for expansion in the same coverage area of existing MSCs, HHO IMTs are required between the new and existing neighboring MCSs. Similarly, in the CDMA femtocell networks, the femtocell convergence server (FCS) that handles the femtocell call control requires HHO IMTs to all the macro MSCs in the femtocell network serving area. When adding another FCS to expand the capacity in the same serving area, the new FCS will also require HHO IMTs to all the Macro MSCs in the femtocell serving area. Additionally, in a geographically redundant femtocell network where there are mated FCSs that are separated geographically, there may be instances that, due to network issues, the femtocell will be served by the mated FCS of a different geographic area that does not have IMTs to the femtocell serving area Macro MSCs.

Therefore, there is a need in the art for an improved method and apparatus for supporting IP encapsulated tandem hard handoffs in CDMA networks.

SUMMARY OF THE INVENTION

Embodiments of the present disclosure provide methods and solutions to overcome the above limitations by using IP Encapsulated Tandem Hard Handoff methods and procedures to enable to tandem the HHO request to a MSC or FCS that have an IMT to the Macro MSC in the Mobile serving area.

According to an embodiment, a method in a serving mobile switching center (MSC) for performing a tandem handoff in a wireless communication network is provided. A handoff request from a serving base station (BS) for a handoff to a target BS of a target MSC is received at the serving MSC. A tandem handoff request is sent from the serving MSC to a tandem MSC when the serving MSC does not have physical handoff trunks.

According to another embodiment, an apparatus in a serving mobile switching center (MSC) for performing a tandem handoff in a wireless communication network is provided. The apparatus includes a communication interface and a controller. The communication interface receives a handoff request from a serving base station (BS) for a handoff to a target BS of a target MSC. The controller generates a tandem handoff request and causes the tandem handoff request to be sent to a tandem MSC when the serving MSC does not have physical handoff trunks.

According to another embodiment, a method in a mobile switching center (MSC) for performing a tandem handoff in a wireless communication network is provided. A tandem handoff request from a serving MSC is received at the MSC. A target MSC is determined by the MSC based on the tandem handoff request. A hard handoff request is sent from the MSC to the target MSC when the MSC has physical handoff trunks.

According to yet another embodiment, an apparatus in a mobile switching center (MSC) for performing a tandem handoff in a wireless communication network. The apparatus includes a communication interface and a controller. The communication interface receives a tandem handoff request from a serving MSC. The controller determines a target MSC based on the tandem handoff request and controls the communication interface to send a hard handoff request to the target MSC when the MSC has physical handoff trunks.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

With regard to the following description, it is noted that the term "wireless switching center" is another term for "wireless soft switch" used below. Further, the term "macrocell" can represent a "base station," "macrocell site," or a "sector" belonging to a "base station". In the present disclosure, "cell site," and "base station" are used interchangeably to indicate the actual transmission units (may be "sector" or "base station" and the like) in the wireless system. It is noted that in all the following figures, some optional features are explicitly marked while some are omitted for clarity purpose.

With regard to the following description, it is also noted that the term "femtocell" is used in describing some embodiments. However, the mention of femtocells is only for descriptive purposes and not intended to limit the scope of the present disclosure. That is, the embodiments of the present disclosure may extend to any "miniature cell site" such as, but not limited to, "microcell," "picocell," and a "cell site on wheels (COW)".

As described in IEEE 802.16m System Requirements, a femtocell is a low power Base Station (BS). In the present disclosure "femtocell" may be used interchangeably with "femto base station" and "femtocell base station." Femtocells are typically installed by a subscriber in a home or small office/home office to provide access to closed or open group of users as configured by the subscriber and/or the access provider. Femtocells typically operate in licensed spectrum and may use the same or different frequency as macrocells and use broadband connection such as cable or DSL for backhaul. The mobile station (MS)'s using access in a femtocell are typically stationary or moving at low (i.e., pedestrian) speed.

Figure 1:
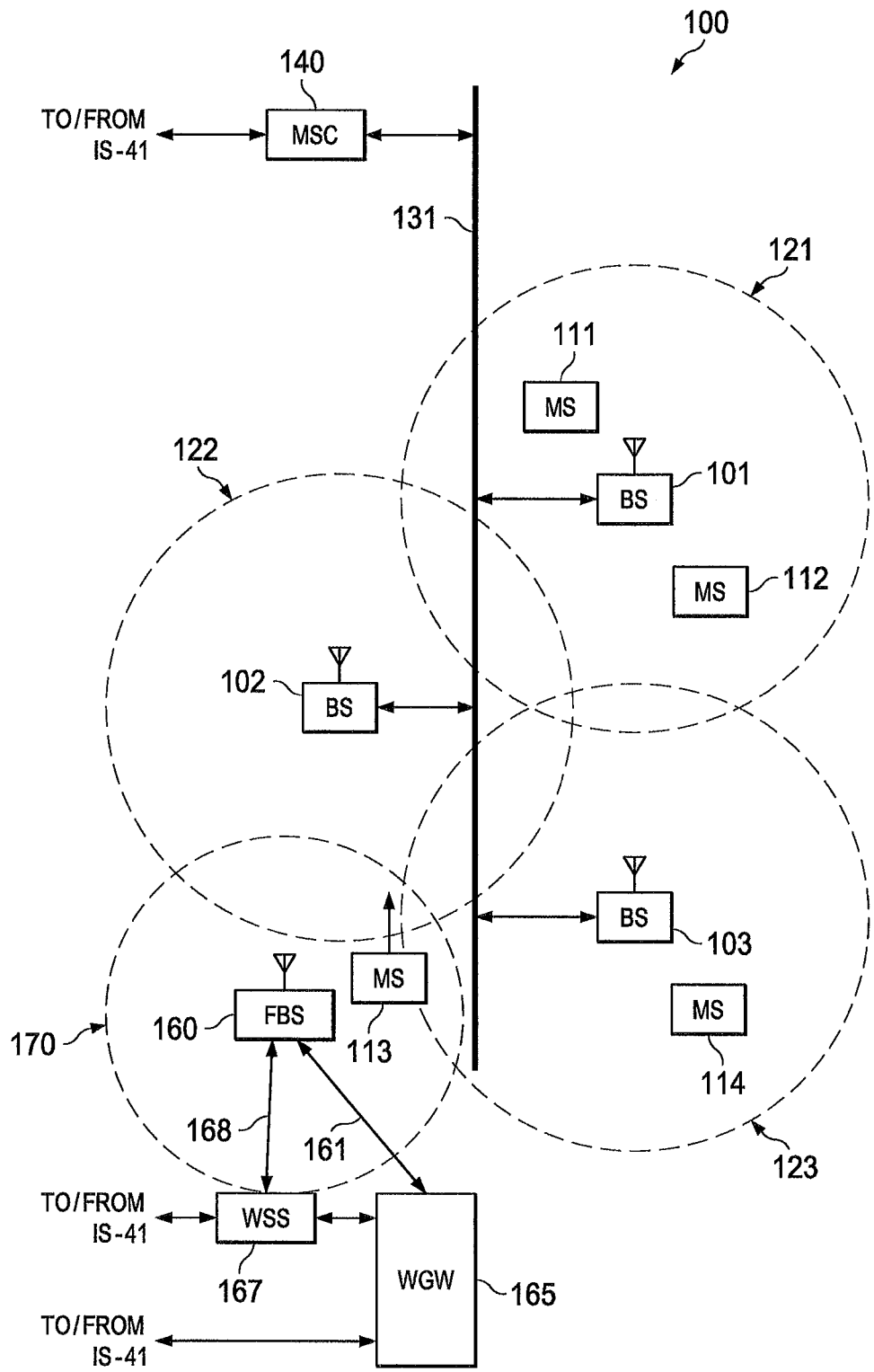
FIG. 1 illustrates a wireless network according to the principles of the present disclosure.

FIG. 1 illustrates a wireless network according to the principles of the present disclosure. The embodiment of wireless network 100 illustrated in FIG. 1 is for illustration only. Other embodiments of the wireless network 100 could be used without departing from the scope of this disclosure.

Wireless network 100 comprises a plurality of cells 121-123, each containing one of the base stations, BS 101, BS 102, or BS 103. Base stations 101-103 communicate with a plurality of mobile stations (MSs) 111-114 using one of many wireless telecommunications standards (e.g. Universal Mobile Telecommunications System (UMTS), Worldwide Interoperability for Microwave Access (WiMAX), Long Term Evolution (LTE), and such. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

Dotted lines show the approximate boundaries of cells 121-123 in which base stations 101-103 are located. The cells are shown approximately circular for the purposes of illustration and explanation only. It should be clearly understood that the cells may have other irregular shapes, depending on the cell configuration selected and natural and man-made obstructions.

As is well known in the art, each of cells 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present disclosure is not limited to any particular cell configuration.

In some embodiments, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present disclosure, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown), or any IS-41 communication network as is known in the art, via communication line 131 and mobile switching center (MSC) 140. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the IS-41, PSTN, or Internet. MSC 140 is well known to those skilled in the art as including processing circuitry (or controller) and a communication interface. In some embodiments of the present disclosure, communications line 131 may be several different data links where each data link couples one of BS 101, BS 102, or BS 103 to MSC 140.

The wireless network 100 also includes a femtocell base station (FBS) 160. FBS 160 is located within the coverage area of 122 of BS 103 and includes components analogous to those found in BS 102, and BS 103. As such, FBS 160 comprises a femto base station controller (FBSC) and one or more femto base transceiver subsystem(s) (FBTS). FBS 160 communicates with mobile stations in its served area using IS-95, CDMA or any other cellular communications standard.

Voice bearer traffic is transferred between the FBS 160 and the IS-41 network (e.g., PSTN) via communication line 161, Wireless Gateway (WGW) 165. Signaling/control traffic is transferred between the FBS 160 and the IS-41 network via communication line 168 and Wireless Soft Switch (WSS) 167. The WGW 165 and WSS 167 are coupled via a backhaul connection (not shown), e.g., the IS-41, to the MSC 140. The WGW 165 provides a bearer path between FBS 160 and MSC 140 via the IS-41. The WSS 167 provides a signaling path to the FBS 160 and WGW 165 as well as to the MSC 140 via the IS-41.

A dotted line shows the approximate boundary of a cell 170 (e.g., coverage area) in which FBS 160 is located. The cell is shown approximately circular for the purposes of illustration and explanation only. It should be clearly understood that the cell may have an irregular shape, depending on the cell configuration selected and natural and man-made obstructions.

Voice bearer traffic is transferred between the FES 160 and the IS-41 network (e.g., PSTN) via communication line 161 and Wireless Gateway (WGW) 165. Signaling/control traffic are transferred between the FES 160 and the IS-41 network via communication line 168 and Wireless Soft Switch (WSS) 167. The WGW 165 and WSS 167 are coupled via a backhaul connection (not shown), e.g., the IS-41, to a mobile switching center (MSC). The WGW 165 provides a bearer path between FES 160 and MSC 140 via the IS-41. The WSS 167 provides a signaling path FES 160 and WGW 165 as well as to the MSC 140 via the IS-41. Though, not shown in FIG. 1, FES 160 and BS 103 may communicate with each other via the backhaul.

Figure 2:
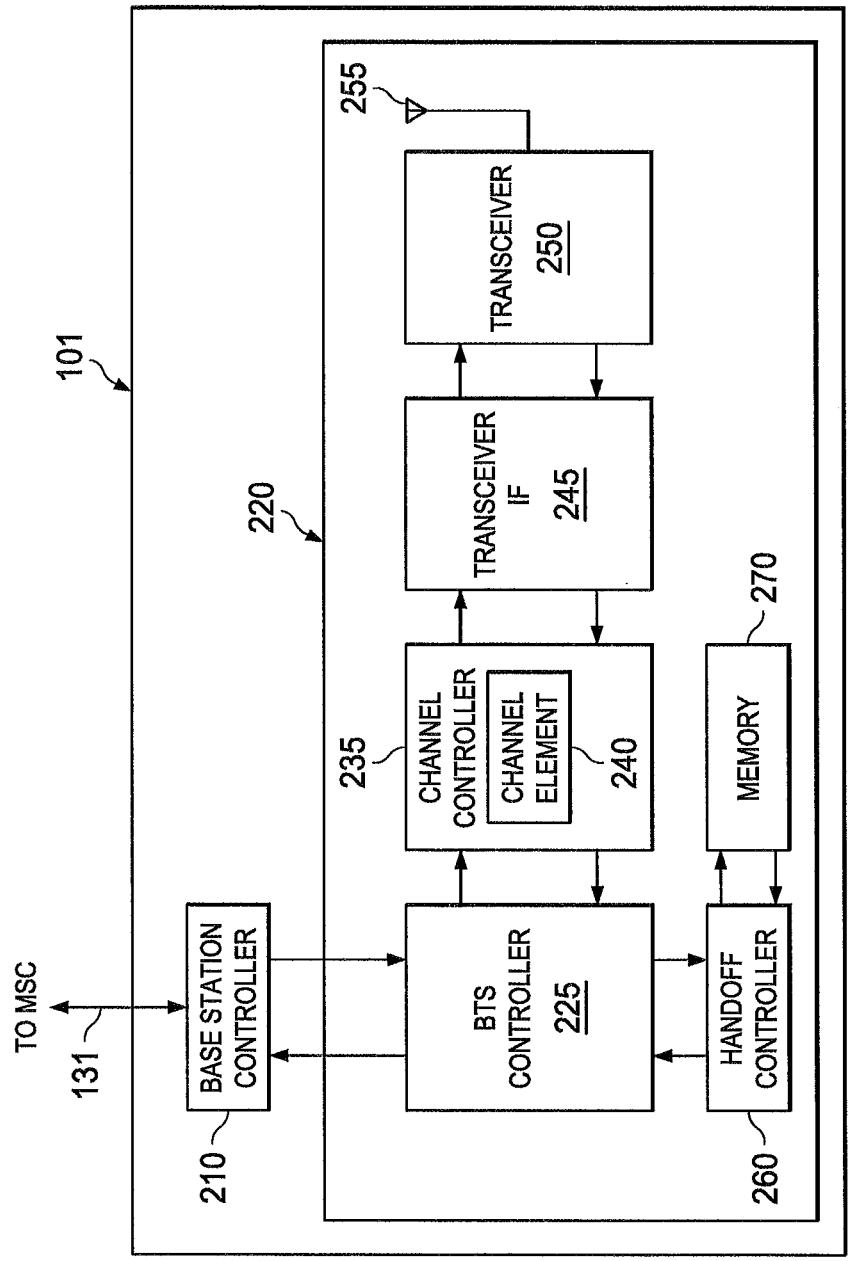
FIG. 2 illustrates macrocell base station 103 according to an embodiment of the present disclosure.

FIG. 2 illustrates macrocell base station 103 according to an embodiment of the present disclosure. The embodiment of ES 103 illustrated in FIG. 2 is for illustration only. Other embodiments of BS 103 could be used without departing from the scope of this disclosure. It will be understood that although BS 103 is described for illustration and example only, descriptions can apply to BS 102 equally.

BS 103 includes base station controller (BSC) 210 and base transceiver subsystem (BTS) 220. Base station controllers and base transceiver subsystems were described previously in connection with FIG. 1. BSC 210 manages the resources in cell site 125, including BTS 220. BTS 220 comprises BTS controller 225, channel controller 235, transceiver interface (IF) 245, RF transceiver unit 250, and antenna array 255. Channel controller 235 comprises a plurality of channel elements, including exemplary channel element 240. BTS 220 also comprises a handoff controller 260. The embodiment of handoff controller 260 and memory 270 included within BTS 220 is for illustration only. Handoff controller 260 and memory 270 can be located in other portions of BS 103 without departing from the scope of this disclosure.

BTS controller 225 includes processing circuitry and memory capable of executing an operating program that communicates with BSC 210 and controls the overall operation of BTS 220. Under normal conditions, BTS controller 225 directs the operation of channel controller 235, which contains a number of channel elements, including channel element 240, that perform bi-directional communications in the forward channels and the reverse channels. A forward channel refers to a channel in which signals are transmitted from the base station to the mobile station. A reverse channel refers to a channel in which signals are transmitted from the mobile station to the base station. In some embodiments, the channel elements communicate according to a code division multiple access (CDMA) protocol with the mobile stations in cell 125. In additional and alternative embodiments, the channel elements communicate according to an OFDMA protocol with the mobile stations in cell 125. Transceiver IF 245 transfers the bi-directional channel signals between channel controller 240 and RF transceiver unit 250.

Antenna array 255 transmits forward channel signals received from RF transceiver unit 250 to mobile stations in the coverage area of BS 103. Antenna array 255 also sends to transceiver 250 reverse channel signals received from mobile stations in the coverage area of BS 103. In some embodiments, antenna array 255 is a multi-sector antenna, such as a three-sector antenna in which each antenna sector is responsible for transmitting and receiving in a 120° arc of coverage area. Additionally, RF transceiver 250 may contain an antenna selection unit to select among different antennas in antenna array 255 during transmit and receive operations.

According to some embodiments, handoff controller 260 is capable of determining a list of candidate target base stations, including other macrocell base stations and femtocell base stations, for handoff. Handoff controller 260 is configured to dynamically adjust a threshold parameter used in inter-frequency (i.e., different frequency) hard handoffs. Handoff controller 260 also is configured to dynamically adjust the threshold parameter used in intra-frequency (i.e., same frequency) hard handoffs. Handoff controller 260 is operable to store the threshold parameters and list of candidate target base stations in a memory 270.

Memory 270 can be any computer readable medium, for example, the memory 270 can be any electronic, magnetic, electromagnetic, optical, electro-optical, electro-mechanical, and/or other physical device that can contain, store, communicate, propagate, or transmit a computer program, software, firmware, or data for use by the microprocessor or other computer-related system or method. Memory 270 comprises a random access memory (RAM) and another part of memory 270 comprises a Flash memory, which acts as a read-only memory (ROM).

Figure 3:
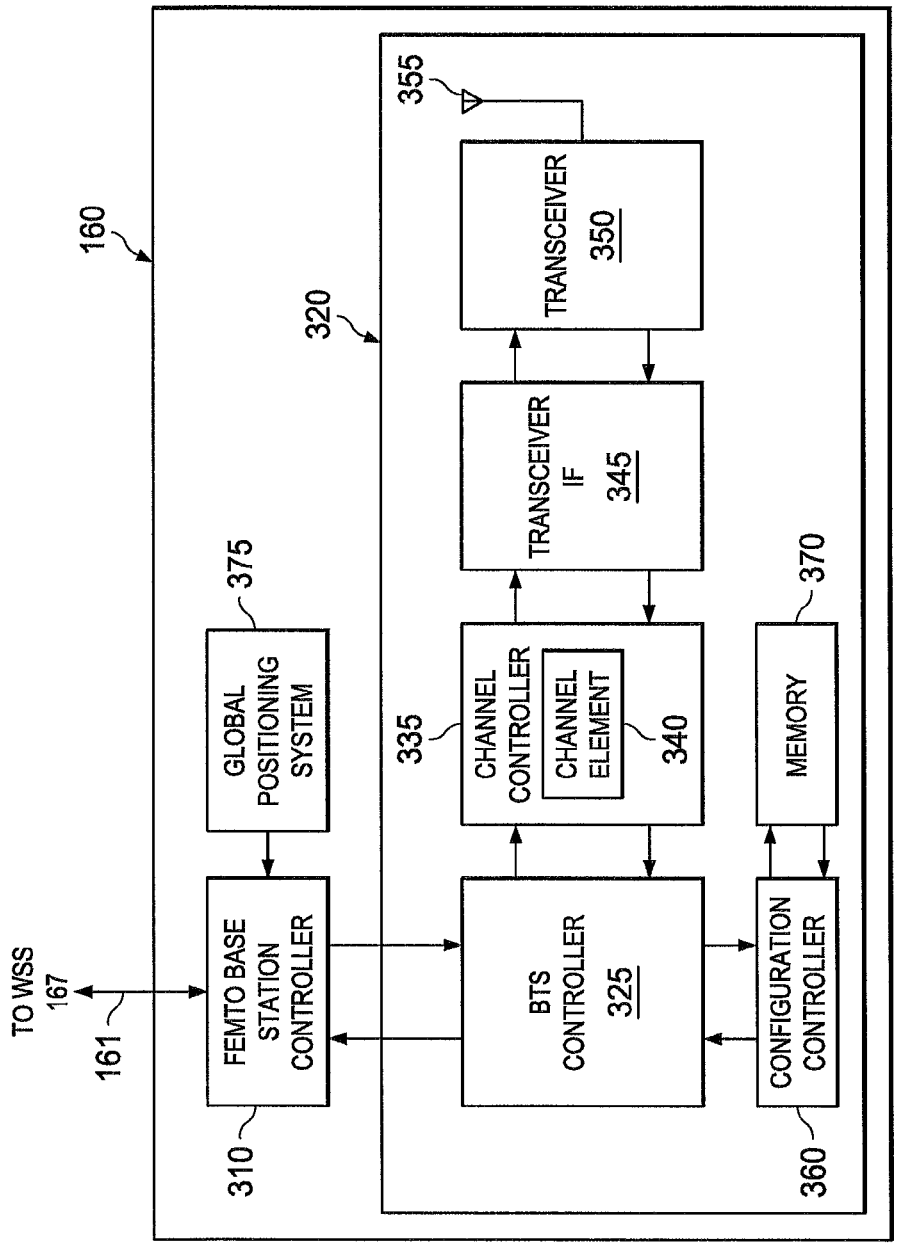
FIG. 3 illustrates the femtocell 160 according to an embodiment of the present disclosure.

FIG. 3 illustrates the femtocell 160 according to an embodiment of the present disclosure. The embodiment of femtocell 160 illustrated in FIG. 3 is for illustrative purposes only as a representative of miniature base stations. Other miniature base stations could be used without departing from the scope of this disclosure.

Femtocell 160 comprises a femto base station controller (FBSC) 310 and femto base transceiver subsystem (FBTS) 320. A femto base station controller is a device that manages wireless communications resources, including the femto base transceiver subsystems, for specified cells within a wireless communications network. A femto base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present disclosure, the femto base transceiver subsystem 320 in femtocell 160 and the femto base station controller 310 associated with the femto base transceiver subsystem 320 are collectively represented by femtocell 160.

FBSC 310 manages the resources in femtocell 160, including FBTS 320, manages backhaul communications with WSS 167 and cell site manager 210, and controls the overall turn-up process in the femtocell 160. During turn-up of the femtocell 160, FBSC 310 is configured to send the current location to the cell site manager 210, receive a list of macrocells from the cell site manager 210, and perform the method for selecting the best candidate macrocells from which the data-fill information can be used by the WSS 167 to establish data entries for the cell site.

FBTS 320 comprises FBTS controller 325, channel controller 335, transceiver interface (IF) 345, RF transceiver unit 350, and antenna array 355. Channel controller 335 comprises a plurality of channel elements, including channel element 340. FBTS 320 also comprises a configuration controller 360. The embodiment of configuration controller 360 and memory 370 included within FBTS 320 is for illustration only. Configuration controller 360 and memory 370 can be located in other portions of FBS 160.

FBTS controller 325 comprises processing circuitry and memory capable of executing an operating program that communicates with FBSC 310 and controls the overall operation of FBTS 320. Under normal conditions, FBTS controller 325 directs the operation of channel controller 335, which contains a number of channel elements, including channel element 340, that perform bi-directional communications in the forward channels and the reverse channels. A forward channel refers to a channel in which signals are transmitted from the base station to the mobile station (also referred to as DOWNLINK communications). A reverse channel refers to a channel in which signals are transmitted from the mobile station to the base station (also referred to as UPLINK communications). Transceiver IF 345 transfers the bi-directional channel signals between channel controller 340 and RF transceiver unit 350. The embodiment of RF transceiver unit 350 as a single device is for illustration only. RF transceiver unit 350 can have separate transmitter and receiver devices without departing from the scope of this disclosure.

Antenna array 355 transmits forward channel signals received from RF transceiver unit 350 to mobile stations in the coverage area 170 of femtocell 160. Antenna array 355 also sends to transceiver 350 reverse channel signals received from mobile stations in the coverage area 170 of BS 160. In some embodiments of the present disclosure, antenna array 355 is a multi-sector antenna, such as a three-sector antenna in which each antenna sector is responsible for transmitting and receiving in a '120' degree arc of coverage area. Additionally, RF transceiver 350 may contain an antenna selection unit to select among different antennas in antenna array 355 during transmit and receive operations.

According to some embodiments of the present disclosure, FBTS controller 325 is operable to execute programs, such as an operating system (OS) and processes for resource allocations, stored in a memory 370. Memory 370 can be any computer readable storage medium, for example, the memory 370 can be any electronic, magnetic, electromagnetic, optical, electro-optical, electro-mechanical, and/or other physical device that can contain, store, communicate, or transmit a computer program, software, firmware, or data for use by the microprocessor or other computer-related system or method. Memory 370 comprises a random access memory (RAM) and another part of memory 370 comprises a Flash memory, which acts as a read-only memory (ROM).

Femtocell 160 also includes a Global Positioning System (GPS) receiver 375. The GPS receiver 375 is configured to determine a geographical position of femtocell 160 and timing information. GPS satellites broadcast signals from space that are picked up and identified by the GPS receiver 375. The GPS receiver 375 then calculates and provides three-dimensional geographical location (latitude, longitude, and altitude) information plus the time. The FBSC 310 can be configured to transmit the geographical position obtained from the GPS receiver 375.

Figure 4:
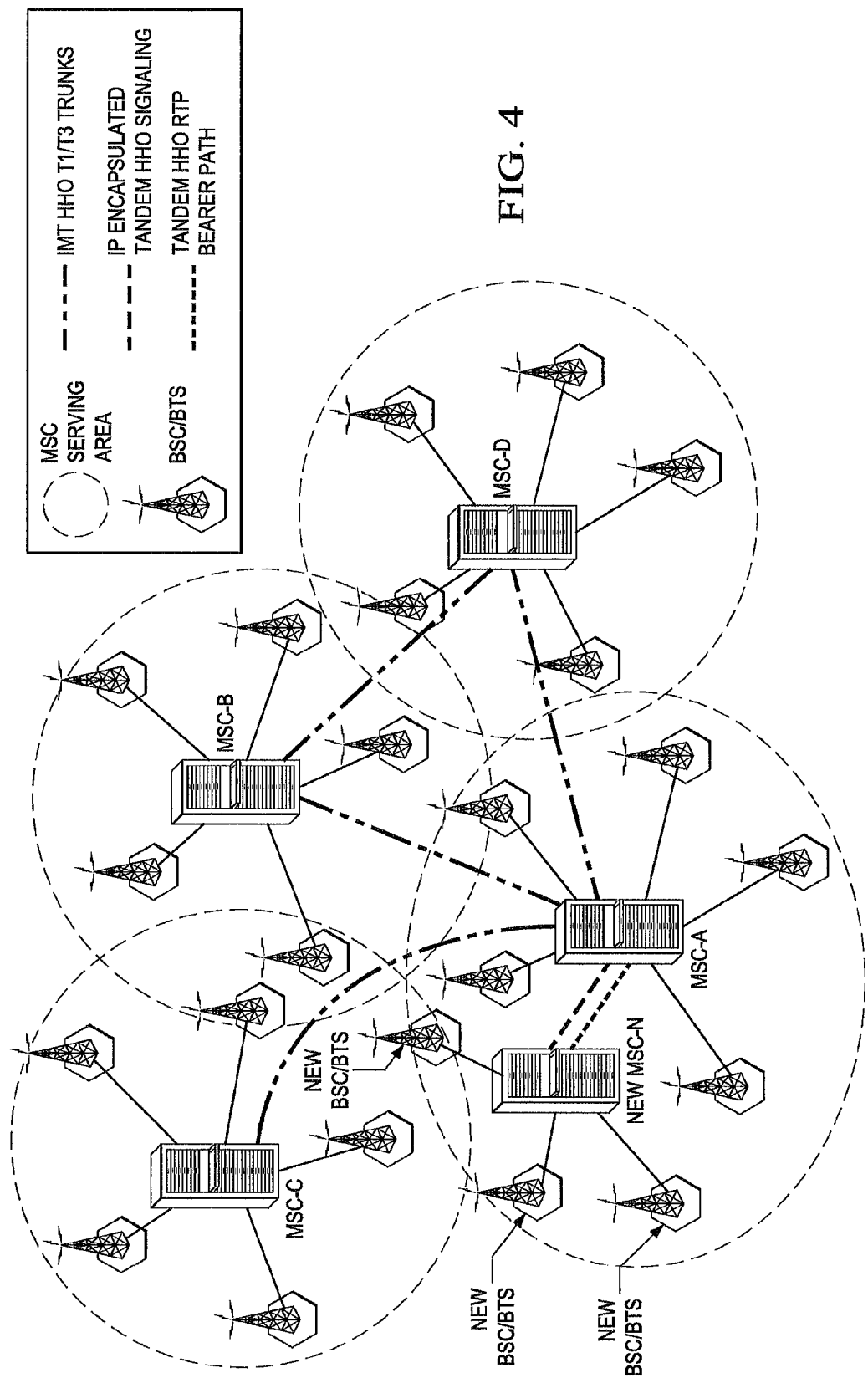
FIG. 4 illustrates a CDMA macro network application of tandem hard handoff according to an embodiment of the present disclosure.

FIG. 4 illustrates a CDMA macro network application of tandem hard handoff according to an embodiment of the present disclosure. In today's networks, mobile switching centers (MSCs), such as MSC 140, are primary service delivery nodes for GSM (Global System for Mobile Communications) and CDMA. MSCs are responsible for routing voice calls and SMS as well as other services. The MSC sets up and releases the end-to-end connection and handles mobility and hand-over requirements during the call. As shown, each of MSC-A, MSC-B, MSC-C, and MSC-D has its own coverage area in which base stations are serviced.

While not shown, each of MSC-A, MSC-B, MSC-C, and MSC-D includes direct inter-machine handoff trunks (IMTs) to the other MSCs. When a new MSC (e.g. New MSC-N) is added to serve the new base stations and expand the same coverage area of an existing MSC (e.g. MSC-A) the network, new hard handoff (HHO) IMTs are needed between the new and existing MSCs. Installing new HHO IMTs between the New MSC-N and all existing MSCs can be very costly.

According to an embodiment, when the new MSC-N is added IMT to the other MSCs are not installed. Instead, when a handoff needs to be performed, the MSC performs a tandem handoff by sending the handoff message through an existing MSC (e.g. MSC-A). That is, when adding new MSC-N, there is no need to add IMT HHO trunks from MSC-N to MSC-A, MSC-B, and MSC-C. MSC-A acts like a HHO Gateway MSC to MSC_N. By using the IP Encapsulated Tandem HHO Messaging, Mobile Hard Handoff is achieved.

Figure 5:
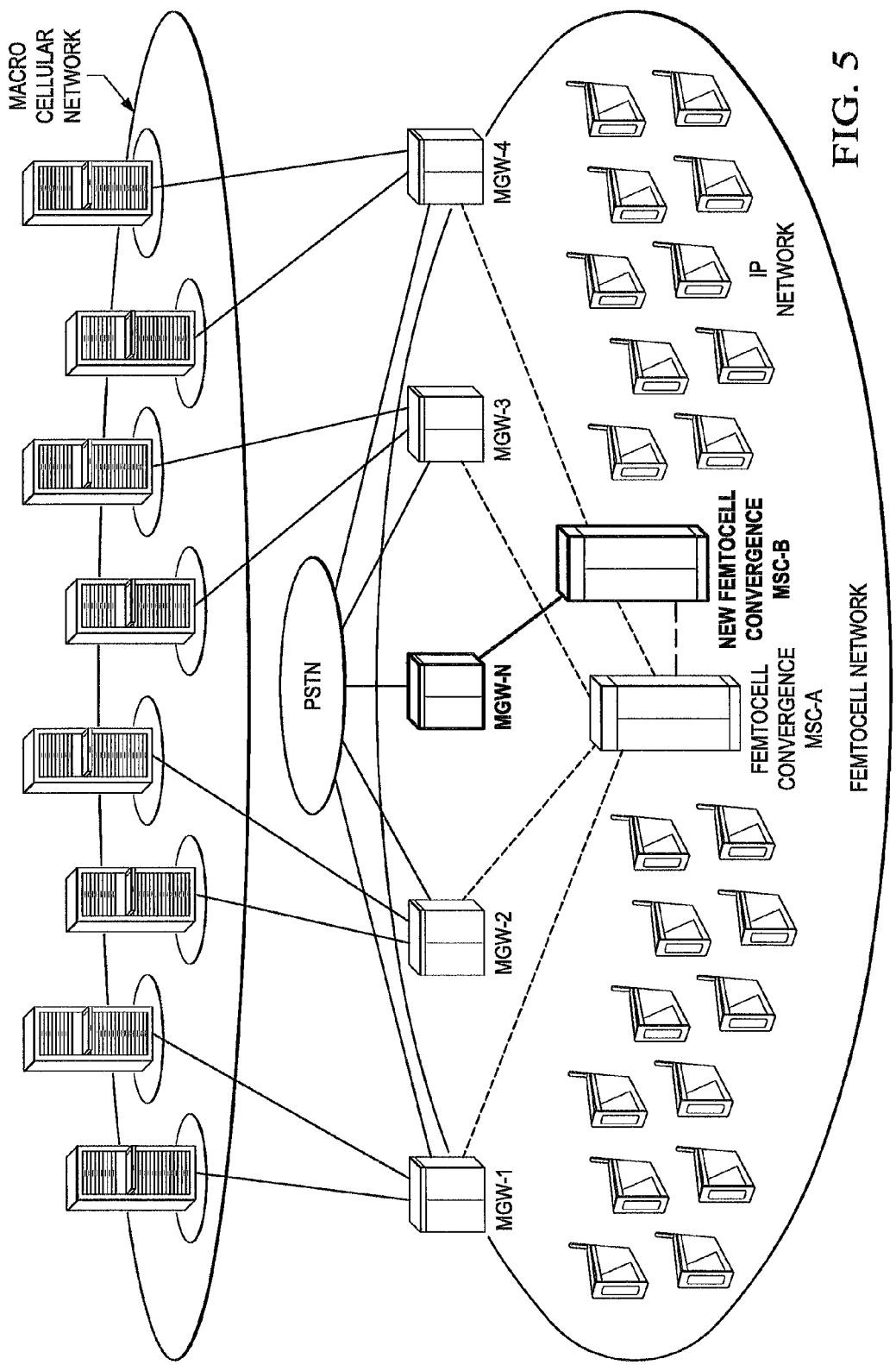
FIG. 5 illustrates a femtocell network architecture according to an embodiment of the present disclosure.

FIG. 5 illustrates a femtocell network architecture according to an embodiment of the present disclosure. As shown, the femtocell network architecture includes a femtocell convergence (FC) MSC-A. Femtocell convergence (FC) refers to small femtocells that are interlinked. An FC-MSC controls the interlinked femtocells and separates the signaling and the media. From the existing media gateways (MGWs) (e.g. MGW-1, MGW-2, MGW-3, and MGW-4), there are trunks to handoff trunks throughout the MSCs in the macrocellular network.

Femtocell capacity may be increased by adding a new femtocell convergence MSC (e.g. FC-MSC-B) to the femtocell network. That is, femtocell capacity may be increased by using FC-MSC-A connectivity such that femtocells and mobile stations (MSs) served by FC-MSC-B can enable HHO to Macro MSCs through FC-MSC-A. When the new FC-MSC-B is added in the femtocell network, the tandem handoff concept can also be extended when adding a new media gateway (e.g. MGW-N). That is, the new MGW-N can use the existing MSCs in the macrocellular network to perform handoffs with the legacy MSCs. The new MGW-N has trunks to the public switched telephone network (PSTN) for voice but no handoff trunks to the legacy MSCs.

Figure 6:
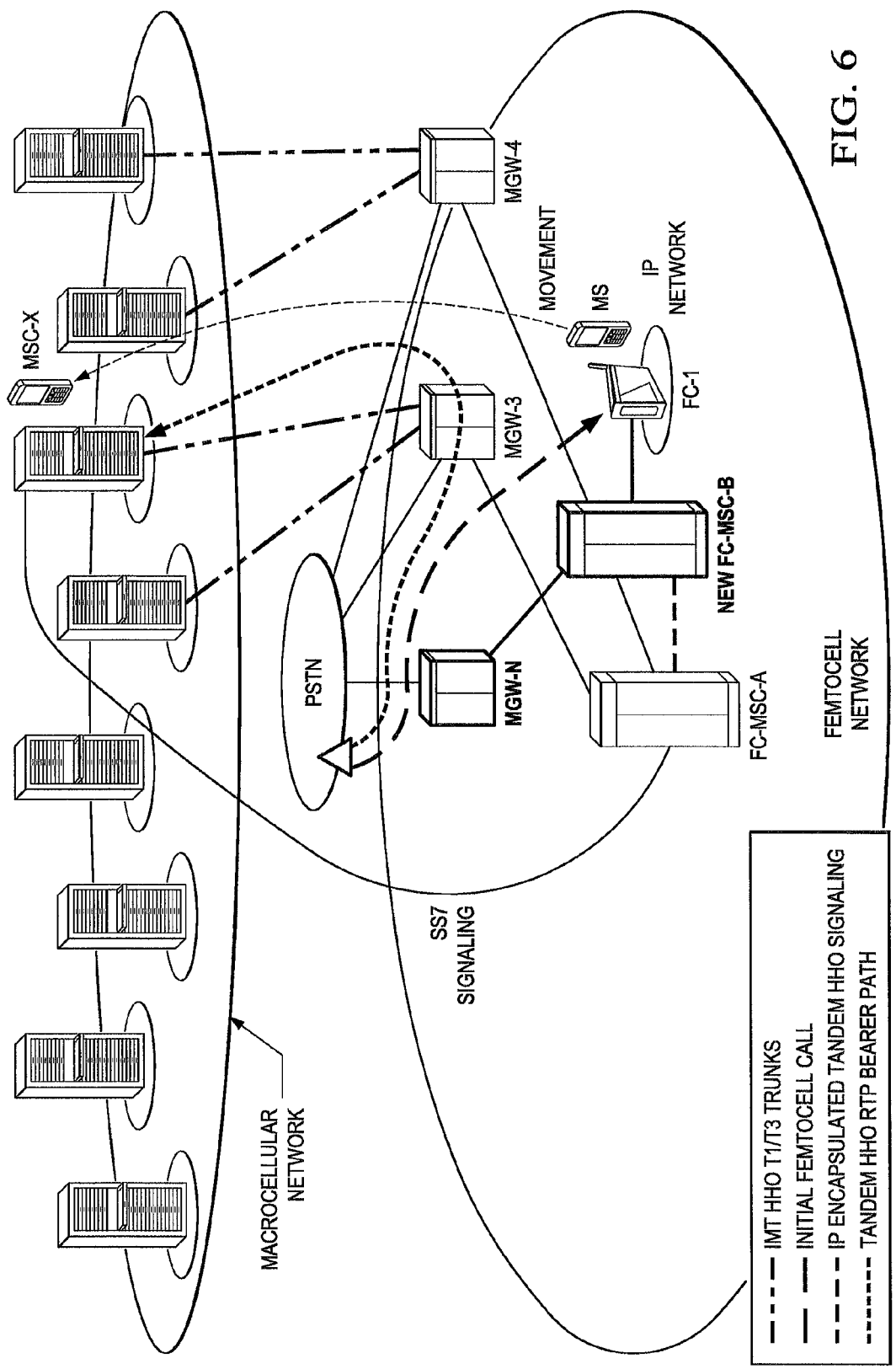
FIG. 6 illustrates bearer path setup for tandem handoff in a femtocell network architecture according to an embodiment of the present disclosure.

FIG. 6 illustrates bearer path setup for tandem handoff in a femtocell network architecture according to an embodiment of the present disclosure. The femtocell (FC-1) serviced mobile station (MS) establishes a call to a public switched telephone network (PSTN) landline phone through the new FC-MSC-B. When the MS moves to the Macro coverage area of MSC-X, the MS sends a handoff request indicating the strongest signal cell tower of MSC-X. According to an embodiment, the handoff request is transmitted through IP encapsulated tandem HHO signaling between the new femtocell convergence MSC (e.g. FC-MSC-B) and the existing femtocell convergence MSC (e.g. FC-MSC-A).

So when a call is serviced through the new FC-MSC-B, the call may be routed through the MGW-N, which is controlled by FC-MSC-B. However, during a tandem handoff, FC-MSC-B is no longer the controlling MGW-N. Therefore, the signals for performing the tandem handoff are routed through MGW-3 and/or MGW-4, which are controlled by FC-MSC-A. Today, the legacy MSC has signaling and physical trunks in the same location. But in the new paradigm of network architecture, the signaling can be taken out and centralized such that the physical trunks are localized to the network.

By using IP encapsulated messaging (IOS or SIP or any other IP based call control protocols) via the IP network, the mobile serving MSC (e.g. MSC-B) sends the mobile assisted handoff request acting as a tandem MSC to the service area MSC (e.g. MSC-A) that has IMTs to perform the mobile handoff. The bearer path is anchored at the serving MSC (now the tandem MSC) and extends the bearer path using the IP network real-time protocol or similar protocol to the service area MSC (termed Handoff MSC) that has IMTs to perform the mobile handoff. The handoff MSC uses the standard IS-41 mobile application protocol messaging to the handoff candidate MSC to perform the handoff using standard CDMA air-interface protocols such as (but not limited to) IS-95 and/or IS-2000.

Figure 7:
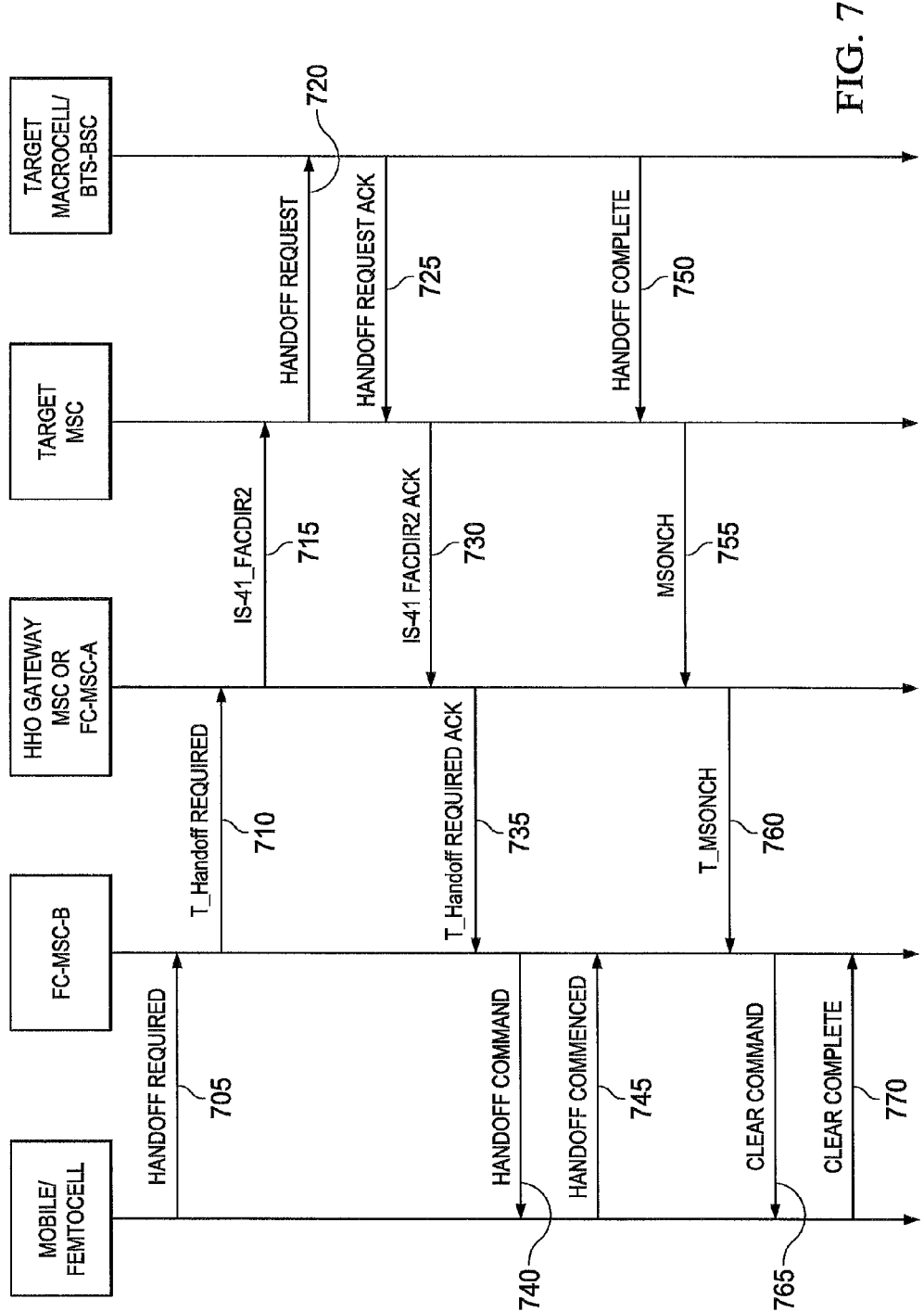
FIG. 7 illustrates a signal flow diagram for a tandem HHO according to an embodiment of the present disclosure.

FIG. 7 illustrates a signal flow diagram for a tandem HHO according to an embodiment of the present disclosure. According to an embodiment, the call flows use CDG (CDMA Development Group) IOS (Inter-Operability Specification) protocol format. SIP and other IP based call processing protocols may also be used according to the embodiment. Messaging between the MS and the femtocell may be based on IS-95 and/or IS-2000 standards, according to an embodiment of the present disclosure. The bearer path for the handoff is established from the MGW-N (controlled by FC-MSC-B) to MGW-3 (controlled by FC-MSC-A) using the IS-41 HHO trunk from MGW-3 to MSC-X. MGW-N to MGW-3 uses real-time protocol (RTP). The process described below occurs when the MS in FIG. 6 moves from femtocell coverage area of FC-MSC-B to the macrocell coverage area of MSC-X.

At step 705, the femtocell (which may be mobile) sends a Handoff Required message to the serving FC-MSC-B. The FC-MSC-B, which analyzes the request (i.e. Handoff Required message) from the femtocell determines that it does not have HHO trunks to the target cell MSC (e.g. MSC-X of FIG. 6). Based on the tandem HHO configuration, the FC-MSC-B identifies FC-MSC-A as the HHO gateway MSC and sends the T_Handoff Required message to FC-MSC-A in step 710. The "T_" notation indicates messaging between components that are in tandem. The T_Handoff Required message may include the required information for FC-MSC-A IS-41 Facility Directive2 (IS-41 FACDIR2) to the target MSC and required data to respond back to FC-MSC-B.

In step 715, FC-MSC-A sends the IS-41_FACDIR2 message to the target MSC. In step 720, the target MSC sends the Handoff Request message to a target BTS/BSC of the macrocell of the target MSC. Assuming that target BTS/BSC can perform the handoff, the target BTS/BSC sends the Handoff Request Acknowledgment message to the target MSC in step 725. In step 730, the target MSC sends the IS-41_FACDIR2 Acknowledgment message to FC-MSC-A.

In Step 735, FC-MSC-A sends the T_Handoff Required Acknowledgment message to FC-MSC-B. In step 740, the FC-MSC-B sends a Handoff Command message to the femtocell. In step 745, the femtocell sends a Handoff Commenced message to FC-MSC-B.

When the MS is captured by the target BTS/BSC in the target macrocell (i.e. when the handoff has been successfully performed), the target BTS/BSC sends a Handoff Complete message to the target MSC in step 750. In step 755, the target MSC sends a Mobile On Channel (MSONCH) message to FC-MSC-A. In step 760, FC-MSC-A sends a Tandem Mobile On Channel (T_MSONCH) message to FC-MSC-B. In step 765, FC-MSC-B sends a Clear Command message to the femtocell to indicate that the HHO is complete. In step 770, the femtocell responds by sending a Clear Complete message to FC-MSC-B.

Figure 8:
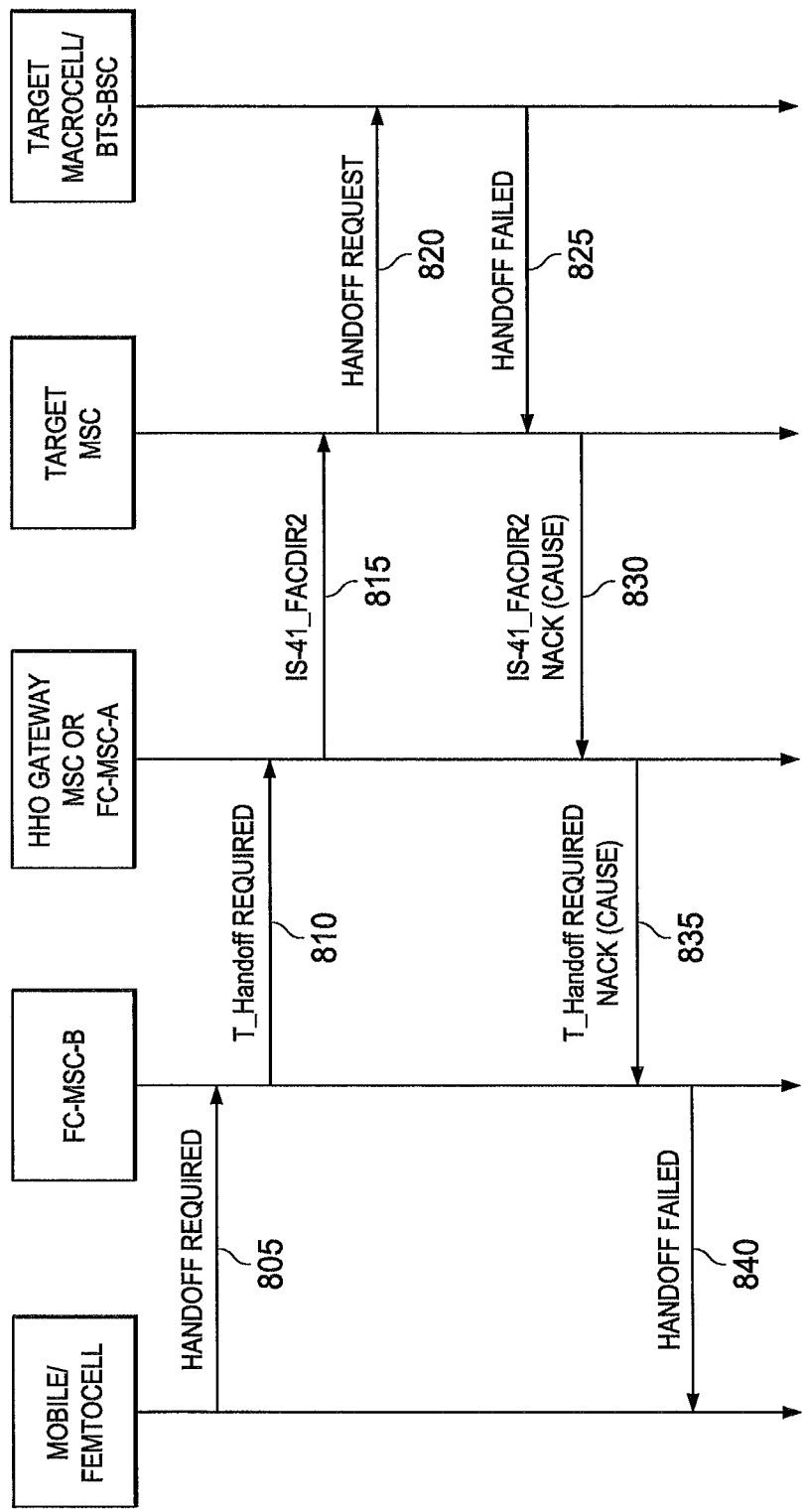
FIG. 8 illustrates a signal flow diagram for a handoff failure according to an embodiment of the present disclosure.

FIG. 8 illustrates a signal flow diagram for a handoff failure according to an embodiment of the present disclosure. The process described below occurs when the MS in FIG. 6 moves from femtocell coverage area of FC-MSC-B to the macrocell coverage area of MSC-X. The call flows use the same protocol as described with regard to FIG. 7. In step 805, the femtocell sends a Handoff Required message to FC-MSC-B (i.e. the serving FC-MSC).

The FC-MSC-B, which analyzes the request (i.e. Handoff Required message) from the femtocell determines that it does not have HHO trunks to the target MSC (e.g. MSC-X of FIG. 6). Based on the tandem HHO configuration, the FC-MSC-B identifies FC-MSC-A as the HHO gateway MSC and sends the T_Handoff Required message to FC-MSC-A in step 810. The "T_" notation indicates messaging between components that are in tandem. The T_Handoff Required message may include the required information for FC-MSC-A IS-41 Facility Directive2 (IS-41 FACDIR2) to the target MSC and required data to respond back to FC-MSC-B.

In step 815, FC-MSC-A sends the IS-41_FACDIR2 message to the target MSC. In step 820, the target MSC sends the Handoff Request message to a target BTS/BSC of the macrocell of the target MSC. When the target BTS/BSC determines that the handoff cannot be performed, the target BTS/BSC sends a Handoff Failed message to the target MSC in step 825. In step 830, the target MSC sends an IS-41_FACDIR2 negative acknowledgment (Nack) message with failure cause to FC-MSC-A. In step 835, the FC-MSC-A sends a Tandem Handoff Required Nack message with the failure cause to FC-MSC-B. In step 840, the FC-MSC-B sends the Handoff Failed message to the femtocell.

Figure 9:
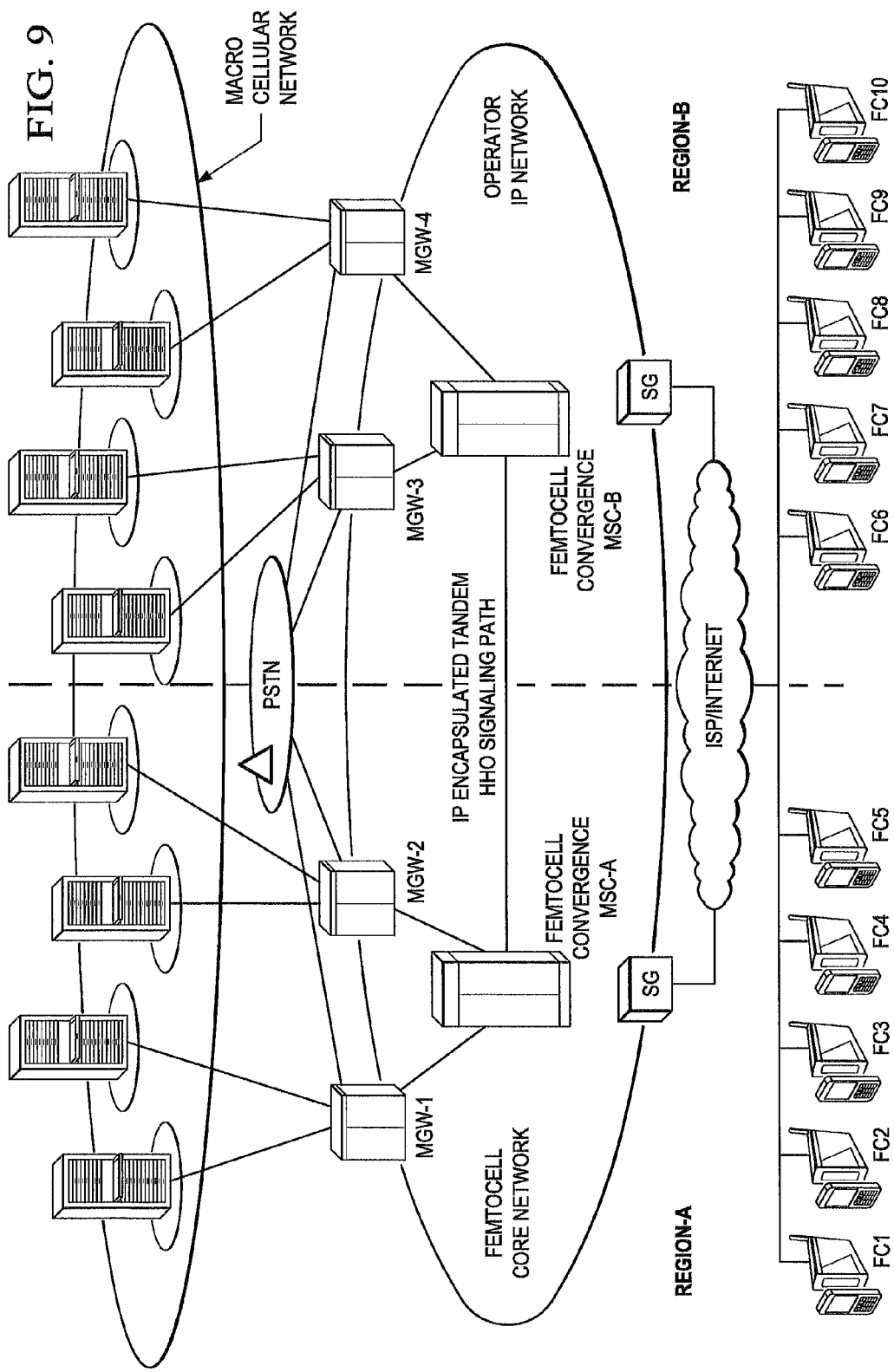
FIG. 9 illustrates a regionalized femtocell network according to an embodiment of the present disclosure.
Figure 10:
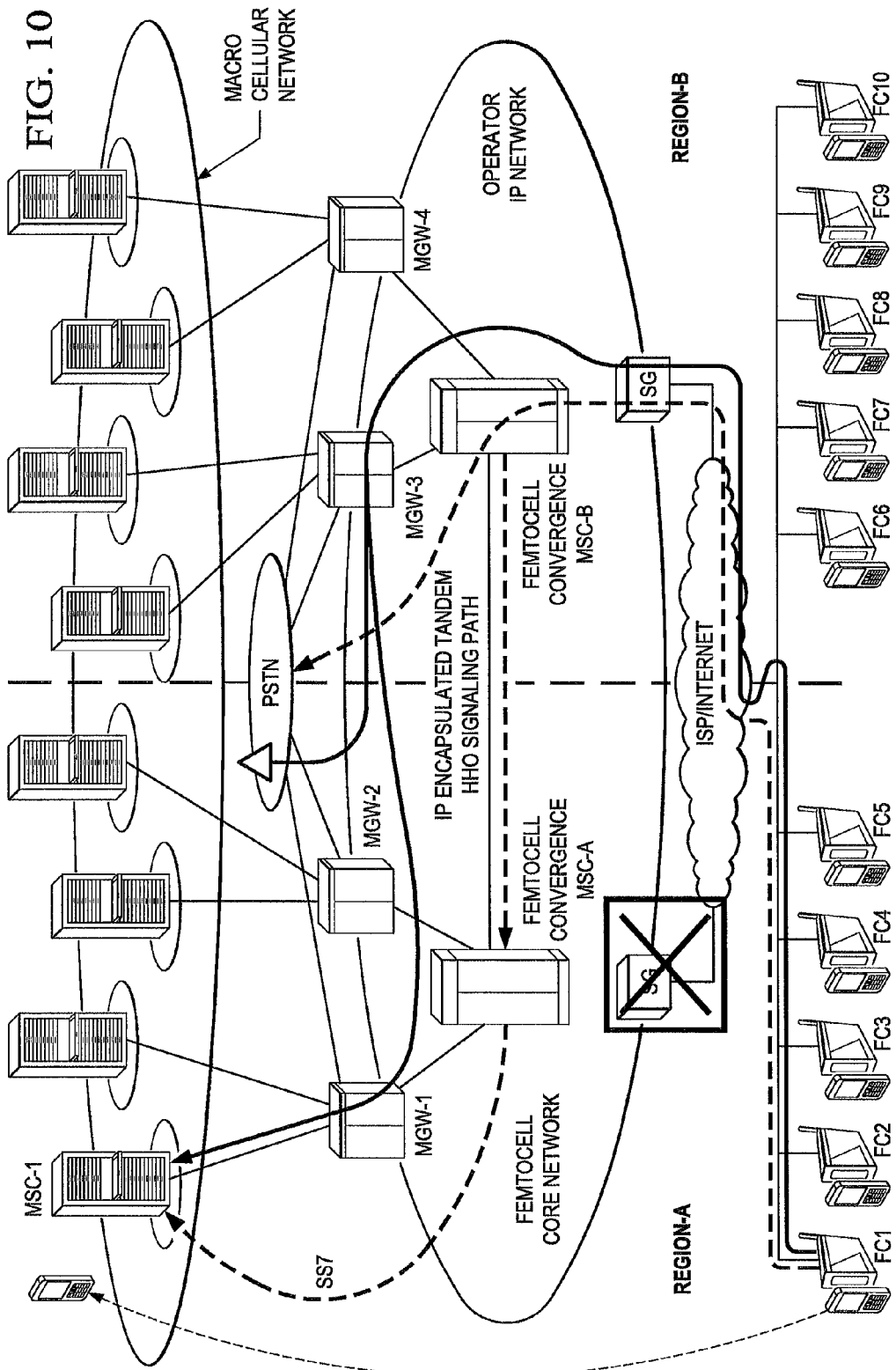
FIG. 10 illustrates a regionalized femtocell network in which an access node has failed.

FIG. 9 illustrates a regionalized femtocell network according to an embodiment of the present disclosure. As shown, the regionalized femtocell network has geo-redundancy between Regions A and B (as opposed to FIGS. 4-6 which illustrated a national deployment). Femtocells FC1, FC2, FC3, FC4, and FC5 are served by FC-MSC-A in Region-A via the Region-A Security Gateway (SG). Femtocells FC6, FC7, FC8, FC9, and FC10 are served by FC-MSC-B in Region-B via the Region-B Security Gateway (SG). Femtocells are configured with primary and backup region information. In this situation, FC1's primary service region is Region-A SG and FC-MSC-A. The secondary region is Region-B and FC-MSC-B. If the Region-A network is unreachable (as shown in FIG. 10), FC1 will connect to Region-B service area through the Internet. Within the Operator network, Region-A and Region-B have network connectivity and is operational. In the event a FC1 serviced Mobile is moving to the macrocell network coverage area of MSC-1, the IP encapsulated tandem handoff methods described with regard to FIGS. 6 and 7 can be used within the respective region to support the mobile handoff from FC1 to MSC-1.

According to an embodiment, when there's a failure on an access node in Region-A (e.g. failure in the Region-A SG), FC1 may connect with FC-MSC-B through the Region-B SG, such that the call is serviced through Region-B; however, when the MS moves into the coverage area of MSC-1, the handoff is performed in tandem from FC-MSC-B through FC-MSC-A. That is, the handoff is performed in tandem when the target MSC and the serving FC-MSC are in different regions Although the present disclosure has been described with an exemplary embodiment, various changes and modifications may be suggested to one skilled in the art. It is intended that the present disclosure encompass such changes and modifications as fall within the scope of the appended claims.

What is claimed is:
1. A method in a serving mobile switching center (MSC) for performing a tandem handoff in a wireless communication network, the method comprising:
  receiving, at the serving MSC, a handoff request from a serving base station (BS) for a handoff to a target BS of a target MSC; and sending, by the serving MSC, a tandem handoff request to a tandem MSC when the serving MSC does not have physical handoff trunks.

2. The method of claim 1, wherein the tandem handoff request comprises information for identifying the target MSC and information for responding to the tandem handoff request.

3. The method of claim 1, further comprising:
receiving a tandem handoff request acknowledgment from the tandem MSC when the target BS of the target MSC is able to perform the handoff; and
sending a handoff command to the serving base station.

4. The method of claim 1, further comprising:
receiving a tandem handoff request negative acknowledgment from the tandem MSC when the target BS of the target MSC is unable to perform the handoff.

5. The method of claim 1, wherein the serving base station is one of a femto base station and a macro base station.

6. The method of claim 1, further comprising:
receiving a Tandem Mobile On Channel message from the tandem MSC when the handoff to the target base station is successful; and
sending a clear command to the serving base station.

7. An apparatus in a serving mobile switching center (MSC) for performing a tandem handoff in a wireless communication network, the apparatus comprising:
a communication interface configured to receive a handoff request from a serving base station (BS) for a handoff to a target BS of a target MSC; and
a controller configured to generate a tandem handoff request and cause the tandem handoff request to be sent to a tandem MSC when the serving MSC does not have physical handoff trunks.

8. The apparatus of claim 7, wherein the tandem handoff request comprises information for identifying the target MSC and information for responding to the tandem handoff request.

9. The apparatus of claim 7, wherein the communication interface is further configured to receive a tandem handoff request acknowledgment from the tandem MSC when the target BS of the target MSC is able to perform the handoff, and send a handoff command to the serving base station.

10. The apparatus of claim 7, wherein the communication interface is further configured to receive a tandem handoff request negative acknowledgment from the tandem MSC when the target BS of the target MSC is unable to perform the handoff.

11. The apparatus of claim 7, wherein the serving base station is one of a femto base station and a macro base station.

12. The apparatus of claim 7, wherein the communication interface is further configured to receive a Tandem Mobile On Channel message from the tandem MSC when the handoff to the target base station is successful, and send a clear command to the serving base station.

13. A method in a mobile switching center (MSC) for performing a tandem handoff in a wireless communication network, the method comprising:
receiving, at the MSC, a tandem handoff request from a serving MSC;
determining, by the MSC, a target MSC based on the tandem handoff request; and
sending, from the MSC, a hard handoff request to the target MSC when the serving MSC does not have physical handoff trunks.

14. The method of claim 13, wherein the tandem handoff request comprises information for identifying the target MSC and information for responding to the tandem handoff request.

15. The method of claim 13, wherein when the MSC is a femtocell convergence (FC) MSC, sending the hard handoff request to the target MSC comprises routing the hard handoff request through a media gateway.

16. The method of claim 13, further comprising:
receiving a hard handoff request acknowledgment from the target MSC when the target BS of the target MSC is able to perform the handoff; and
sending a tandem handoff request acknowledgment to the serving MSC.

17. An apparatus in a mobile switching center (MSC) for performing a tandem handoff in a wireless communication network, the apparatus comprising:
a communication interface configured to receive a tandem handoff request from a serving MSC; and
a controller configured to determine a target MSC based on the tandem handoff request, and control the communication interface to send a hard handoff request to the target MSC when the serving MSC does not have physical handoff trunks.

18. The apparatus of claim 17, wherein the tandem handoff request comprises information for identifying the target MSC and information for responding to the tandem handoff request.

19. The apparatus of claim 17, wherein the controller is further configured to control the communication interface to route the hard handoff request through a media gateway when the MSC is a femtocell convergence (FC) MSC.

20. The apparatus of claim 17, wherein the communication interface is further configured to receive a hard handoff request acknowledgment from the target MSC when the target BS of the target MSC is able to perform the handoff, and send a tandem handoff request acknowledgment to the serving MSC.

* * * * *